United States Patent [19]
Kanetsuku et al.

[11] Patent Number: 6,061,321
[45] Date of Patent: May 9, 2000

[54] DECK LOCK MECHANISM AND LIBRARY APPARATUS

[75] Inventors: Toshihito Kanetsuku; Kenichi Utsumi, both of Kawasaki; Takahisa Miyamoto; Naoki Takayama, both of Inagi, all of Japan

[73] Assignee: Fujitsu Limited, Kawasaki, Japan

[21] Appl. No.: 09/048,364

[22] Filed: Mar. 26, 1998

[30] Foreign Application Priority Data

Sep. 9, 1997 [JP] Japan .................................. 9-244315

[51] Int. Cl.[7] .......................... G11B 17/08; G11B 33/02; G11B 15/68
[52] U.S. Cl. ............................ 369/91; 369/75.1; 369/36; 360/92
[58] Field of Search .................................. 369/91, 34, 36, 369/75.1, 292; 360/92, 137; 361/685, 747, 726, 727

[56] References Cited

U.S. PATENT DOCUMENTS

| | | |
|---|---|---|
| 4,214,172 | 7/1980 | See .......................................... 307/150 |
| 4,754,397 | 6/1988 | Varaiya et al. .......................... 364/200 |
| 4,817,070 | 3/1989 | Hug et al. ................................. 369/36 |
| 5,077,722 | 12/1991 | Geist et al. ............................. 369/75.1 |
| 5,212,681 | 5/1993 | Bock et al. ............................. 369/244 |
| 5,379,184 | 1/1995 | Barraza et al. ......................... 361/685 |
| 5,388,946 | 2/1995 | Baur ........................................ 414/281 |
| 5,737,189 | 4/1998 | Kammersgard et al. ............... 361/726 |
| 5,852,739 | 12/1998 | Radloff et al. .............................. 712/1 |
| 5,867,003 | 2/1999 | Hashimoto et al. ............... 318/568.11 |
| 5,870,245 | 2/1999 | Kersey et al. ............................. 360/92 |

*Primary Examiner*—David L. Ometz
*Assistant Examiner*—Angel Castro
*Attorney, Agent, or Firm*—Greer, Burns & Crain, Ltd.

[57] ABSTRACT

The present invention automatically limits the number of decks drawable from a large number of decks within one locker. For this purpose, the decks are classified into sets each comprising two decks adjacent to each other. A deck lock mechanism according to this invention is composed of a first locking mechanism for, when one deck belonging to each of the deck sets is in a drawn condition, inhibiting the other deck from being drawn; and a second locking mechanism for inhibiting the one deck from being drawn when the other deck is in a drawn condition. This invention is applicable to a large-capacity external storage memory storing a large number of cartridges such as magnetic tape cartridges and optical disk cartridges.

5 Claims, 10 Drawing Sheets

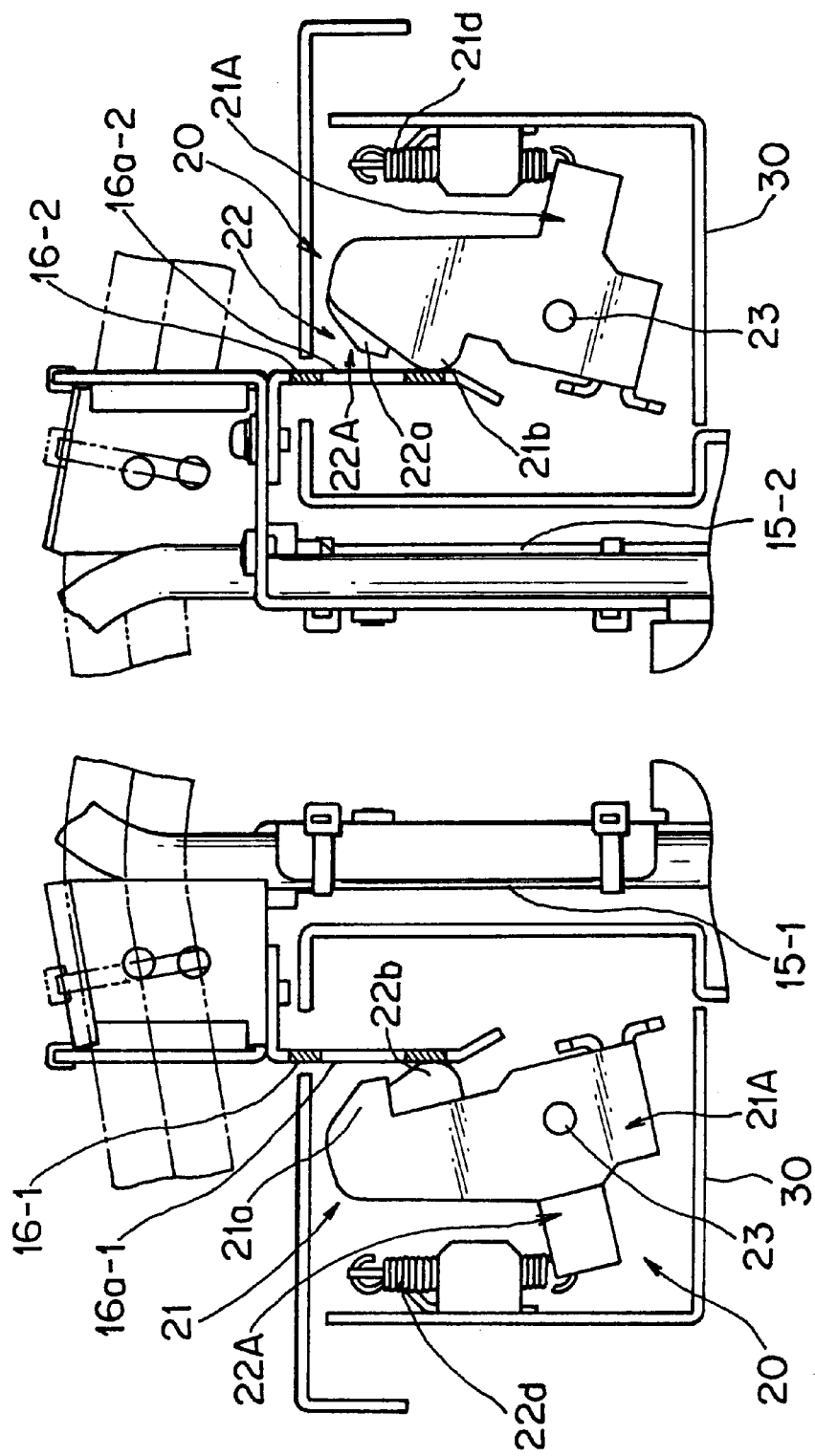

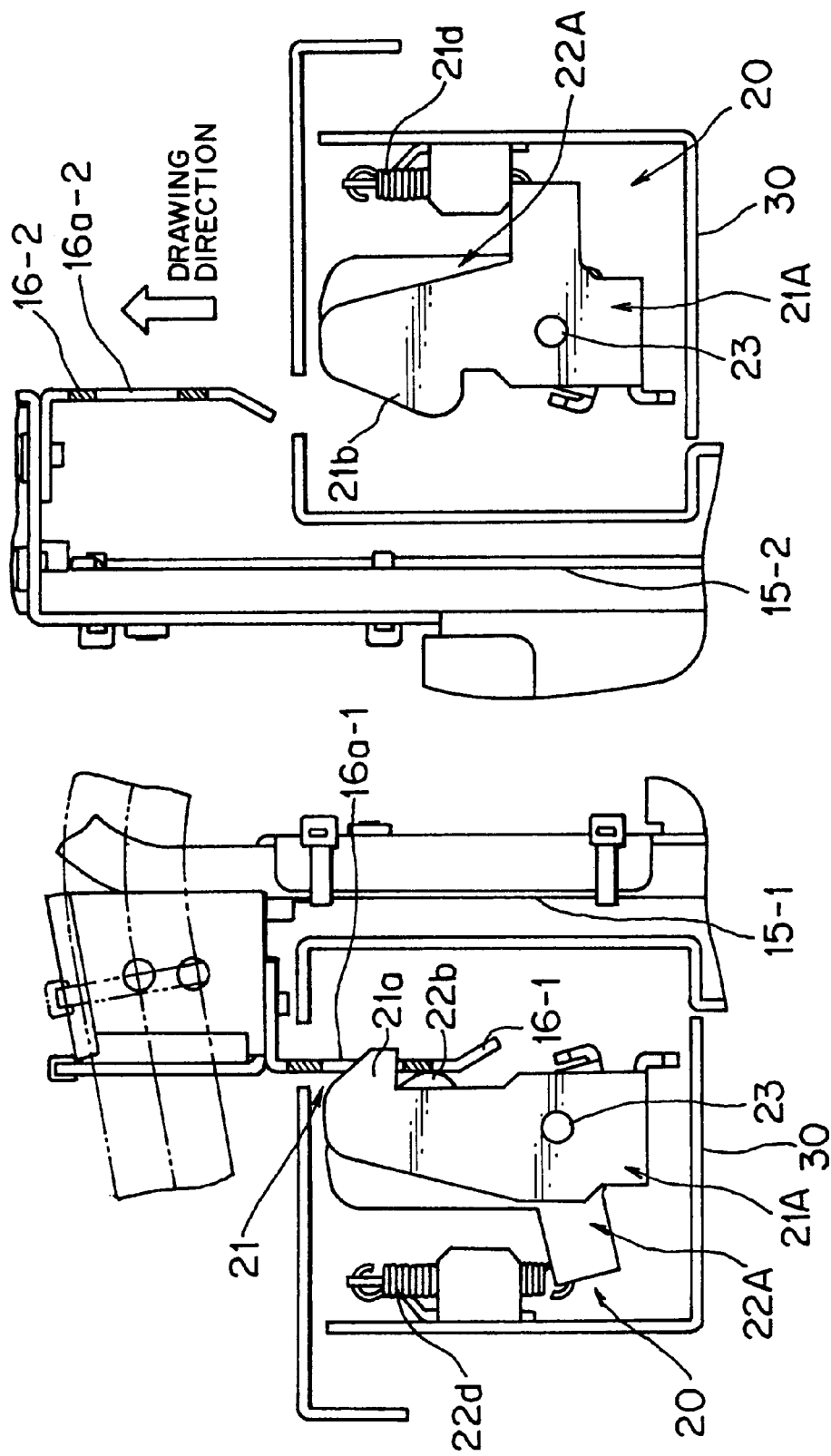

DECK LOCK MECHANISM AND LIBRARY APPARATUS

BACKGROUND OF THE INVENTION

1) Field of the Invention

The present invention relates to a deck lock mechanism in which, a plurality of decks (recording/reproduction units) each for conducting processing such as write/read of recording/recorded data toward a storage medium within a cartridge such as a magnetic tape cartridge and an optical disk cartridge are mounted in one locker to be drawable therefrom. The present invention automatically inhibits a given number of decks or more from being simultaneously drawn therefrom, and further relates to a library apparatus equipped with the same deck lock mechanism.

2) Description of the Related Art

In general, a library apparatus functions as a large-capacity external storage memory, and a storage rack in its locker stores several thousands of cartridges each accommodating, for example, a magnetic tape as a storage medium. Access such as write/read of recording/recorded data is automatically done toward the storage medium within each of the cartridges.

Furthermore, in addition to the aforesaid storage rack (storage unit) for storing cartridges, the library apparatus is equipped with a station for conducting the entry of a cartridge from the external into the apparatus and the exit of the cartridge from the interior of the apparatus to the external. A plurality of magnetic tape decks (which will be referred hereinafter to as decks are provided) for conducting operations such as write/read of recording/recorded data with respect to a storage medium (magnetic tape) within a cartridge, and an accessor robot (which will be referred hereinafter to as an accessor) conveys the cartridges among the cartridge entry/exit station, the storage rack and the decks.

In such a library apparatus, in response to an access request to one cartridge from a host unit or the like, the accessor travels toward the storage rack to search for a cartridge there, and subsequently, a hand mechanism grips that cartridge and transfers it to the deck for insertion into the deck. With these operations, in that deck, given processing is done with respect to the storage medium (magnetic tape) within the inserted cartridge. After the completion of the processing, the cartridge discharged or ejected from the deck is again gripped by the hand mechanism and conveyed by the accessor up to the storage rack to be stored at a given position.

In a prior library apparatus, a plurality of decks are mounted within one locker (tape drive mount unit). In this case, since each of the decks is of a large size, one locker can accept only four decks. However, recently, owing to the accomplished size reduction of the decks, a requirement has arisen for enlarging the number of decks to be mounted within one locker by the employment of the size-reduced decks.

SUMMARY OF THE INVENTION

The present invention has been developed with a view to eliminating these problems, and it is therefore an object of this invention to provide a deck lock mechanism and library apparatus which are capable of increasing the numbers of decks to be mounted within one locker in a manner of automatically limiting the number of the decks drawable.

For this purpose, in accordance with the present invention, there is provided a deck lock mechanism installed in a locker incorporating a plurality of decks each designed to process a storage medium within a cartridge and made to be drawable therefrom, the deck lock mechanism fulfilling a function to inhibit, of the plurality of decks, a given number of decks or more from being concurrently drawn from the locker in a state where the plurality of decks are classified into sets each comprising two decks adjacent to each other, and comprising a first locking mechanism for, when one deck belonging to each of the deck sets is in a drawn condition, inhibiting the other deck from being drawn, and a second locking mechanism for inhibiting the one deck from being drawn when the other deck is in the drawn condition.

With this arrangement, if one of the two decks belonging to the same set is drawn or pulled out from the locker, the first locking mechanism automatically inhibits the other from being drawn therefrom. In a similar way, when the other deck is drawn from the locker, the second locking mechanism automatically inhibits the one deck from being drawn therefrom. Consequently, it is possible to automatically limit the total number of the decks drawable to half or less.

In this case, it is also appropriate that the first locking mechanism is made up of a first locking section, a first unlocking section, a first interlocking mechanism and a first biasing member, which will be described herein later.

The first locking section is for the purpose of inhibiting the other deck from being drawn in a state of being engaged on the other deck side, while the first unlocking section is made to be put out of the way (retreated) by the one deck in a state where the one deck is stored in the locker.

Furthermore, the first interlocking mechanism interlocks the first locking section with the first unlocking section so that the first locking section breaks off its locking condition when the first unlocking section is put out of the way, while being engaged on the other deck side to come into the locking condition when the first unlocking section is not put out of the way.

Still further, the first biasing member is made to bias the first locking section in a direction of locking it on the other deck side.

In the above-mentioned arrangement, in a state where the two decks belonging to the same set are accommodated within the locker, the first unlocking section is put out of the way by the one deck, and releasing from the locking condition by the first locking section occurs through the first interlocking mechanism, and hence, the other deck becomes drawable for being not in the condition locked with the first locking section. In this state, if the one deck is drawn, the biasing force of the first biasing member creates a state in which the first unlocking section is not put out of the way, that is, the first locking section automatically shifts into the locking condition of being engaged on the other deck side, thus automatically inhibiting the other deck from being drawn.

On the other hand, as in the case of this first locking mechanism, the second locking mechanism can be composed of a second locking section, a second unlocking section, a second interlocking mechanism and a second biasing member, which will be described herein later.

The second locking section fulfills a function to inhibit one deck from being drawn in a condition of being engaged on the one deck side, while the second unlocking section is made to be put out of the way by the other deck in a state where the other deck is accommodated within the locker.

Furthermore, the second interlocking mechanism interlocks the second locking section with the second unlocking section so that the second locking section breaks off its locking condition when the second unlocking section is put out of the way, while it is engaged on the one deck side to come into the locking condition when the second unlocking section is not put out of the way.

Still further, the second biasing member is made to bias the second lock section in a direction of locking it on the one deck side.

In the above-mentioned arrangement, as well as the above-mentioned first locking mechanism, in a state where the two decks belonging to the same set are accommodated within the locker, the second unlocking section is put out of the way by the other deck, and releasing from the locking condition by the second locking section occurs through the second interlocking mechanism, and hence, the one deck becomes drawable for not being in the condition locked with the second locking section. In this state, if the other deck is drawn, the biasing force of the second biasing member produces a state in which the second unlocking section is not put out of the way, that is, the second locking section automatically shifts into the locking condition of being engaged on the one deck side, thus automatically inhibiting the other deck from being drawn.

In addition, in accordance with this invention, a library apparatus comprises a storage rack for storing cartridges each accommodating a storage medium, a plurality of decks each for carrying out access to the storage medium within the cartridge, an accessor for transferring the cartridge between the storage rack and the decks, and a locker in which the plurality of decks are mounted to be drawable therefrom, where the plurality of decks are classified into sets each comprising two decks adjacent to each other, and further comprises a deck lock mechanism including a first locking mechanism for, when one deck belonging to each of the deck sets is in the drawn condition, inhibiting the other deck from being drawn, and a second locking mechanism for inhibiting the one deck from being drawn when the other deck is in the drawn condition.

In the library apparatus according to this invention, with this arrangement, when one of two decks belonging to the same set is drawn from the locker, the first locking mechanism automatically inhibits the other deck from being drawn therefrom. In like manner, if the other deck is drawn, the second locking mechanism automatically inhibits the one deck from being drawn. Consequently, it is possible to automatically limit the number of the decks drawable to half or less.

Thus, in the deck lock mechanism and library apparatus according to this invention, when one of two decks appertaining to the same set is drawn from the locker, the first locking mechanism automatically inhibits the other deck from being drawn out therefrom. On the other hand, if the other deck is drawn, the second locking mechanism automatically inhibits the one deck from being drawn. Accordingly, without the manual operation by the operator, the number of decks drawable can automatically restrictively be reduced to half or less, which can sharply improve the work efficiency at the maintenance and inspection of the decks and further can certainly prevent the occurrence of falling-down or deformation of the locker accommodating the decks. This arrangement allows a large number of decks to be mounted in one locker.

BRIEF DESCRIPTION OF THE DRAWINGS

FIGS. 8A and 8B are an illustration of a portion indicated by an arrow A in FIG. 1 and an illustration of a portion pointed out with an arrow B in FIG. 1, respectively, showing a state in which two decks appertaining to the same set are both in accommodated conditions in this embodiment;

FIGS. 10A and 10B are an illustration of a portion indicated by an arrow A in FIG. 1 and an illustration of a portion pointed out with an arrow B in FIG. 1, respectively, showing a state in which the lower one of the two decks appertaining to the same set is in a drawn condition in this embodiment.

DESCRIPTION OF THE PREFERRED EMBODIMENTS

An embodiment of the present invention will be described hereinbelow with reference to the drawings.

First of all, referring to FIG. 2, a description will be made hereinbelow of the entire arrangement of a library apparatus to which this embodiment is applicable.

Figure 2:
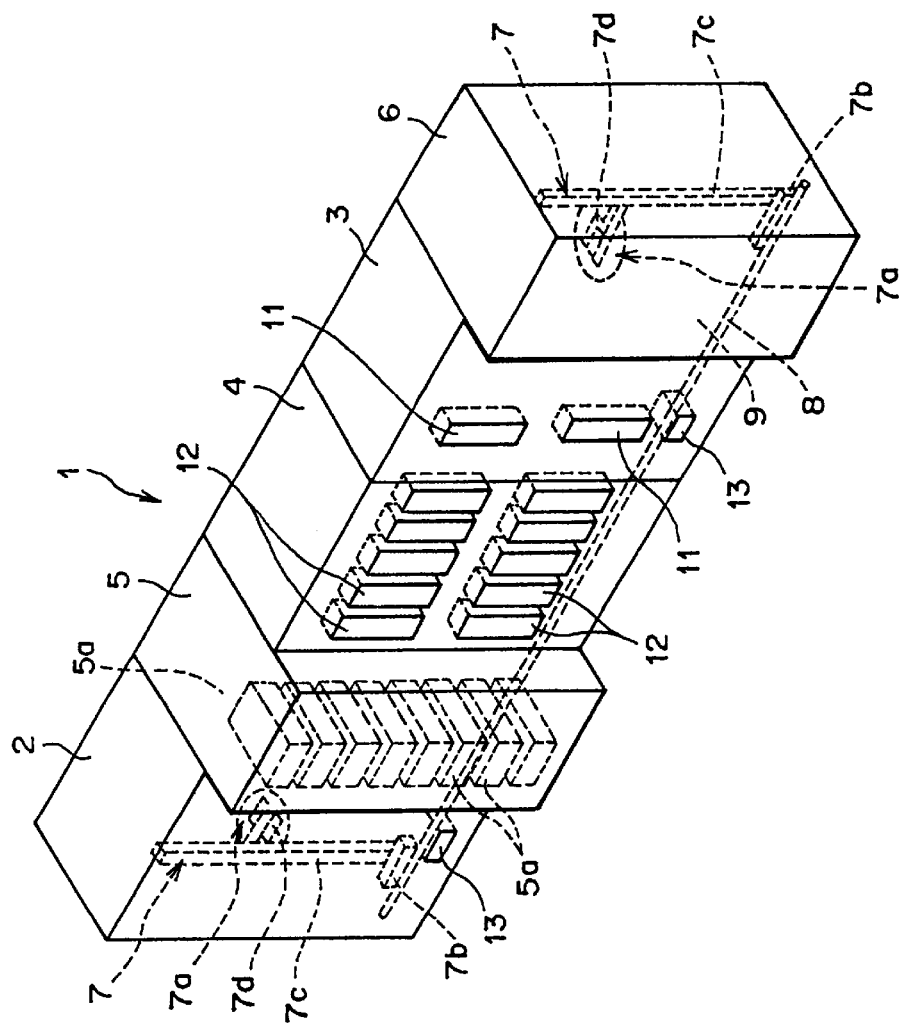
FIG. 2 is a perspective view illustratively showing the entire arrangement of a library apparatus to which this embodiment is applicable.

FIG. 2 is a perspective view illustratively showing the entire arrangement of a library apparatus to which this embodiment is applicable. As shown in FIG. 2, a library apparatus 1 according to this embodiment stores a large number of magnetic tape cartridges (not shown; cartridges each accommodating a magnetic tape as a storage medium) and conducts access such as write/read of recording/recorded data toward each of the magnetic tape cartridges, with the library apparatus 1 being constructed with a plurality of lockers as will be described herein later, and being installed in a state where its one surface is placed into contact with a wall.

The library apparatus 1 is composed of, for example, left and right (two) accessor units (which will be referred hereinafter to as LAU, RAU, respectively) 2, 3, a cartridge storage unit (which will be referred hereinafter to as a CSU) 4, a tape drive mount unit (which will be referred hereinafter to as a TMU) 5, and an accessor extend unit (which will be referred hereinafter to as an AEU) 6, which are in a connected relation to each other. Also included in the apparatus 1 are accessor robots (transferring mechanisms; which will be referred hereinafter to as accessors) 7 which are located on the left and right sides, respectively, and which move within these units 2 to 6 to transfer the cartridges.

The LAU 2 and RAU 3 function as garages for the accessors 7, respectively, and on the front side of the RAU 3 (the external space side, that is, the side where the operator operates the apparatus) there are provided a pair of upper and lower cartridge entry/exit stations [each of which will be referred hereinafter to as a CAS (Cartridge Access Station)]

11, 11 for carrying out the entry or exit of the cartridge into or from the library apparatus 1 and a cartridge forced exit station (FES) 13 for forcedly discharging a defective cartridge to the external. In addition, another FES 13 is placed on the front side of LAU 2.

Figure 3:
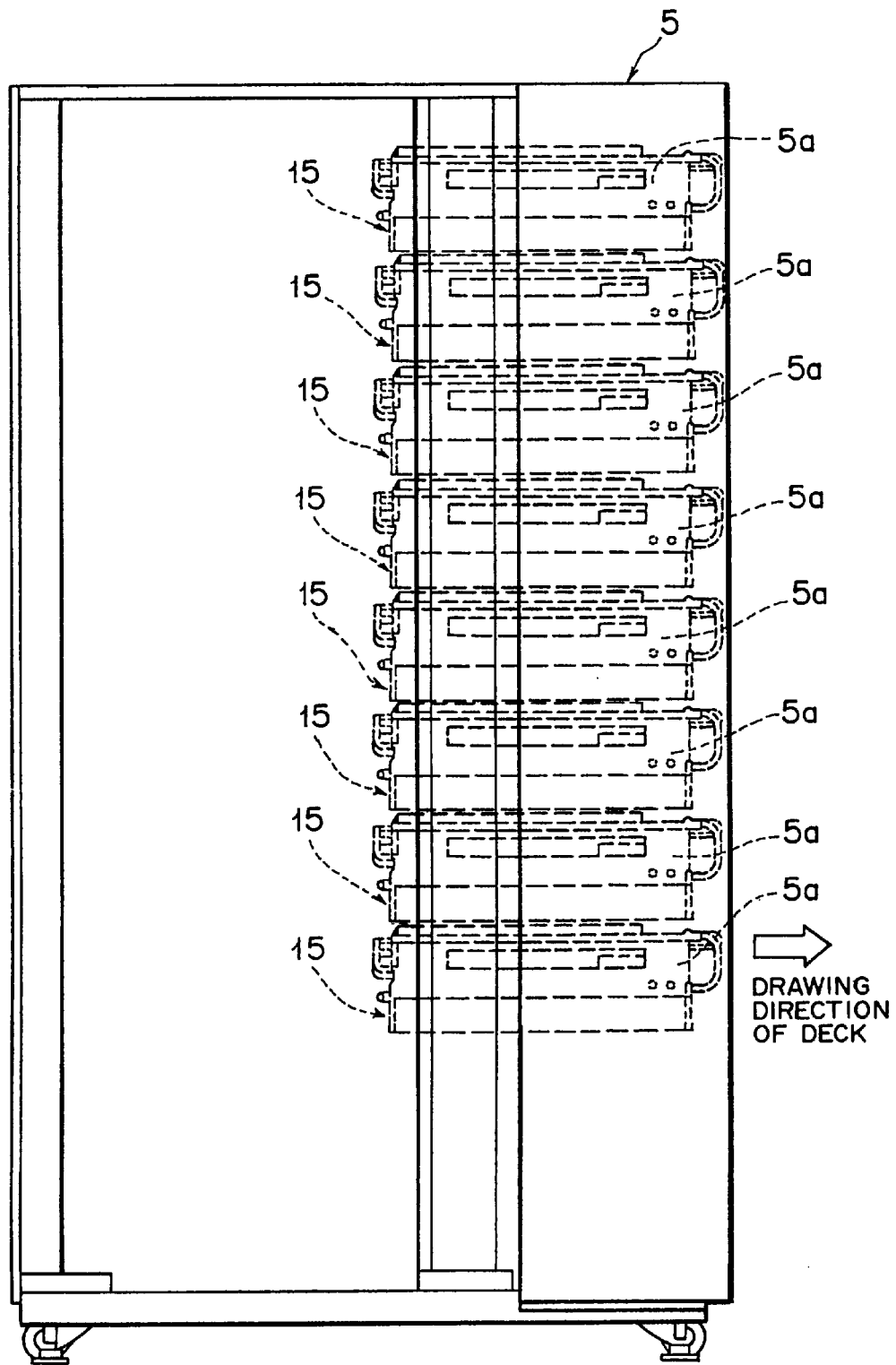
FIGS. 3 and 4 are respectively a side elevational view and a front elevational view each showing a locker (TMU) in this embodiment.

The CSU 4 stores a large number of cartridges in its locker, and in more detail, as shown in FIG. 3, it has, on its outer wall surface side, five cartridge direct entry/exit stations (each of which will be referred hereinafter to as a DEE) 12 in its upper section and five DEEs 12 in its lower section, ten in total. In each of the DEEs 12, a magazine (not shown) storing a plurality of cartridges is set in order to permit the simultaneous entry or exit of the plurality of cartridges into or from the library apparatus 1.

Furthermore, a storage rack (not shown) having a large number of cells for storing a large number of cartridges is placed on an inner wall surface (a rear side wall surface in the case of the CSU 4) of each of the LAU 2, RAU 3 and CSU 4, and the cartridge from the CAS 11 or the DEE 12 is stored in a given cell of the storage rack through the use of the accessor 7.

Figure 4:
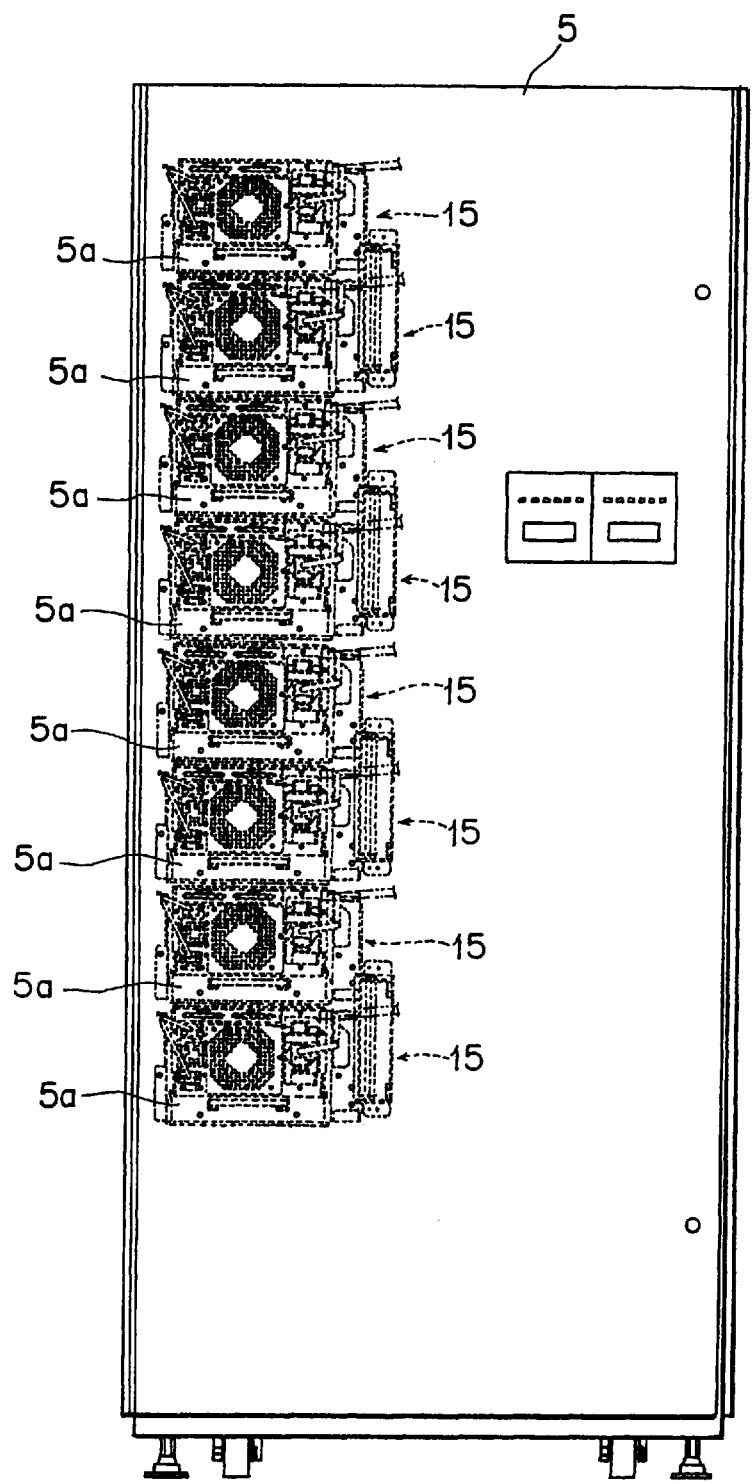

In this embodiment, as shown in FIGS. 2 to 4, the TMU (locker) 5 has eight magnetic tape decks (MTUs; which will be referred hereinafter to as decks) 5a vertically arranged, and each of the decks 5a conducts the write/read processing of recording/recorded data onto/from a magnetic tape within the cartridge transferred by the accessor 7. Further, each of the decks 5a is held in a deck tray 15 (see FIGS. 5 to 7) and is mounted through the deck tray 15 to be drawable from the TMU 5.

The AEU 6 includes a power source (not shown) for supply of an operating power to each of the accessors 7 and a controller (not shown) for control of the accessors 7.

These units 2 to 6 are in a coupled relation to each other and disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which runs through the units 2 to 6, and placed on the bottom surface of this operating space 9 is a rail (X rail) 8 for guiding the respective accessors 7, which allows each of the accessors 7 to move within the operating space 9.

In addition to a hand mechanism 7d for gripping the cartridge to perform the insertion/extraction thereof, each of the accessors 7 has a carriage 7b movable in the horizontal directions along the X rail 8 for moving a hand assembly 7a including this hand mechanism 7d up to a given position and a vertical column 7c for vertically guiding the hand assembly 7a on the carriage 7b.

In the library apparatus 1 thus constructed, the cartridge from the CAS 11 or the DEE 12 is gripped and taken out by the hand mechanism 7d of the accessor 7 and is inserted into and stored in a given cell of the storage rack after being carried by the accessor 7 through the operating space 9.

Furthermore, of a large number of cartridges stored in the respective cells of the storage rack, a cartridge(s) specified by a host unit is gripped and pulled out by the hand mechanism 7d of the accessor 7 and then transferred by the accessor 7 through the operating space 9 to the deck 5a of the TMU 5 to be inserted thereinto.

In the deck 5a, after the recording/reproduction processing on/from the magnetic tape housed in the cartridge, the cartridge staying within the deck 5a is discharged therefrom and gripped and taken out by the hand mechanism 7d of the accessor 7 and subsequently inserted into and stored in a given cell of the storage unit by the accessor 7 after passing through the operating space 9.

Incidentally, for discharging the cartridge(s) stored in the storage rack to the exterior of the library apparatus 1, the cartridge to be discharged is gripped by the hand mechanism 7d of the accessor 7 to be taken out from the storage rack and then transferred through the operating space 9 to the CAS 11 or the DEE 12 by the accessor 7 to be inserted into a given position (cell) of the CAS 11 or the DEE 12.

In this embodiment, in the TMU 5 shown in FIGS. 2 to 4, each of the 8 decks 5a is mounted through the deck tray 15 to be drawable for allowing its maintenance and inspection, and if all the decks 5a are simultaneously drawn, because the weight of the 8 decks 5a reaches approximately 100 Kg in total, the center of gravity shifts, so that chances are that the TMU 5 itself falls down or that, for example, the frame structure of the TMU 5 accommodating these decks 5a deforms.

Furthermore, in the library apparatus 1, the cartridge is made to be transferred through the accessor 7 between the storage rack and the deck 5a as mentioned above, and it is necessary to accurately detect the cartridge stored position and the position of the cartridge insertion/discharge opening of the deck 5a, and therefore, the locker structure also needs to have a high dimensional accuracy. The aforesaid deformation of the locker frame structure and others makes it difficult to accurately catch the position of the cartridge insertion/discharge opening of the deck 5a, so that difficulty may be encountered to perform the insertion/extraction of the cartridge into/from the target deck 5a.

For this reason, in this embodiment, the TMU 5 is provided with a deck lock mechanism 20 which has functions to inhibit the deck trays 15 (decks 5a), whose number exceeds half the total number, from being concurrently pulled out from the TMU 5.

Figure 1:
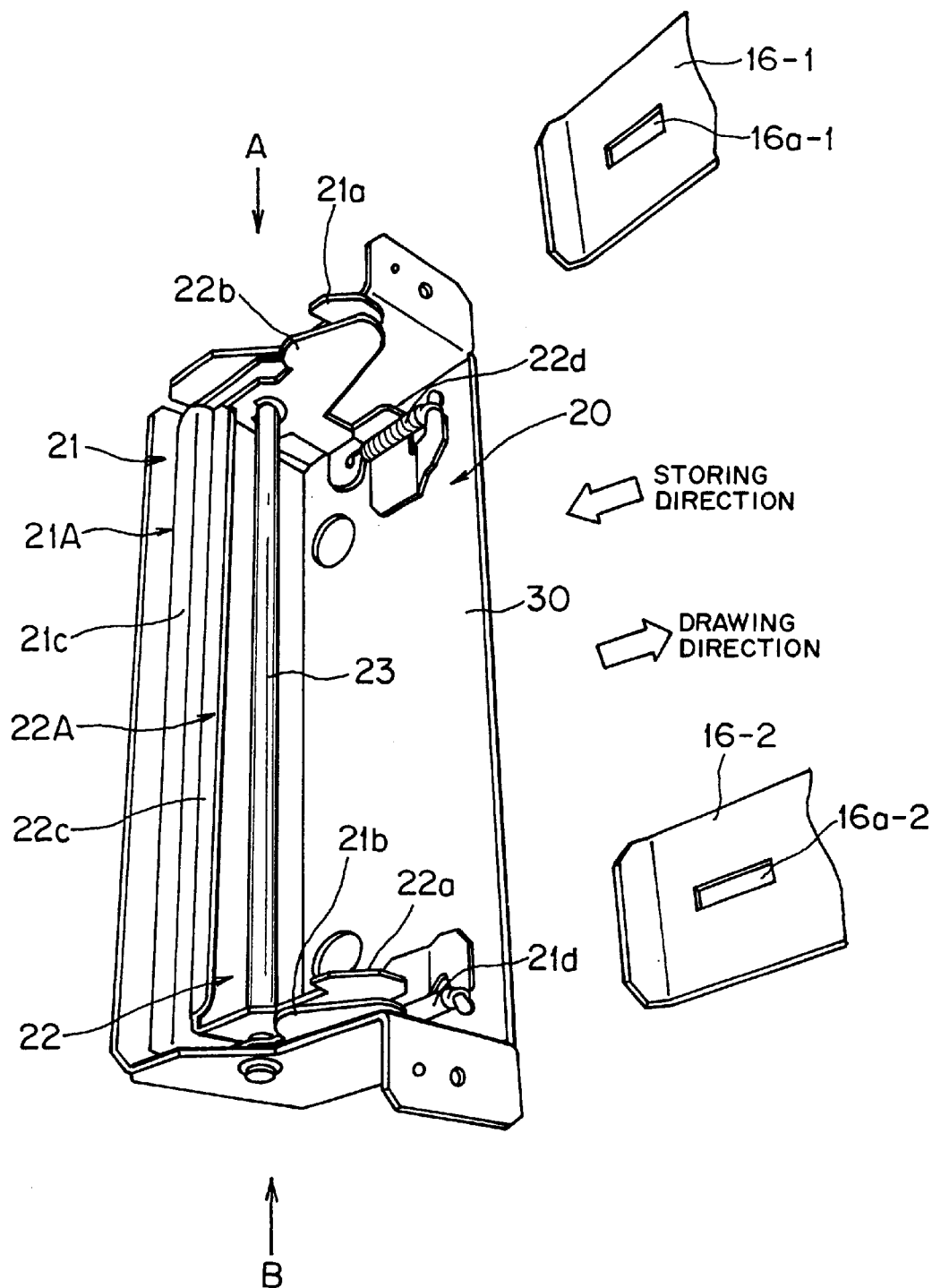
FIG. 1 is a perspective view showing only a principal portion of a deck lock mechanism according to an embodiment of the present invention.
Figure 5:
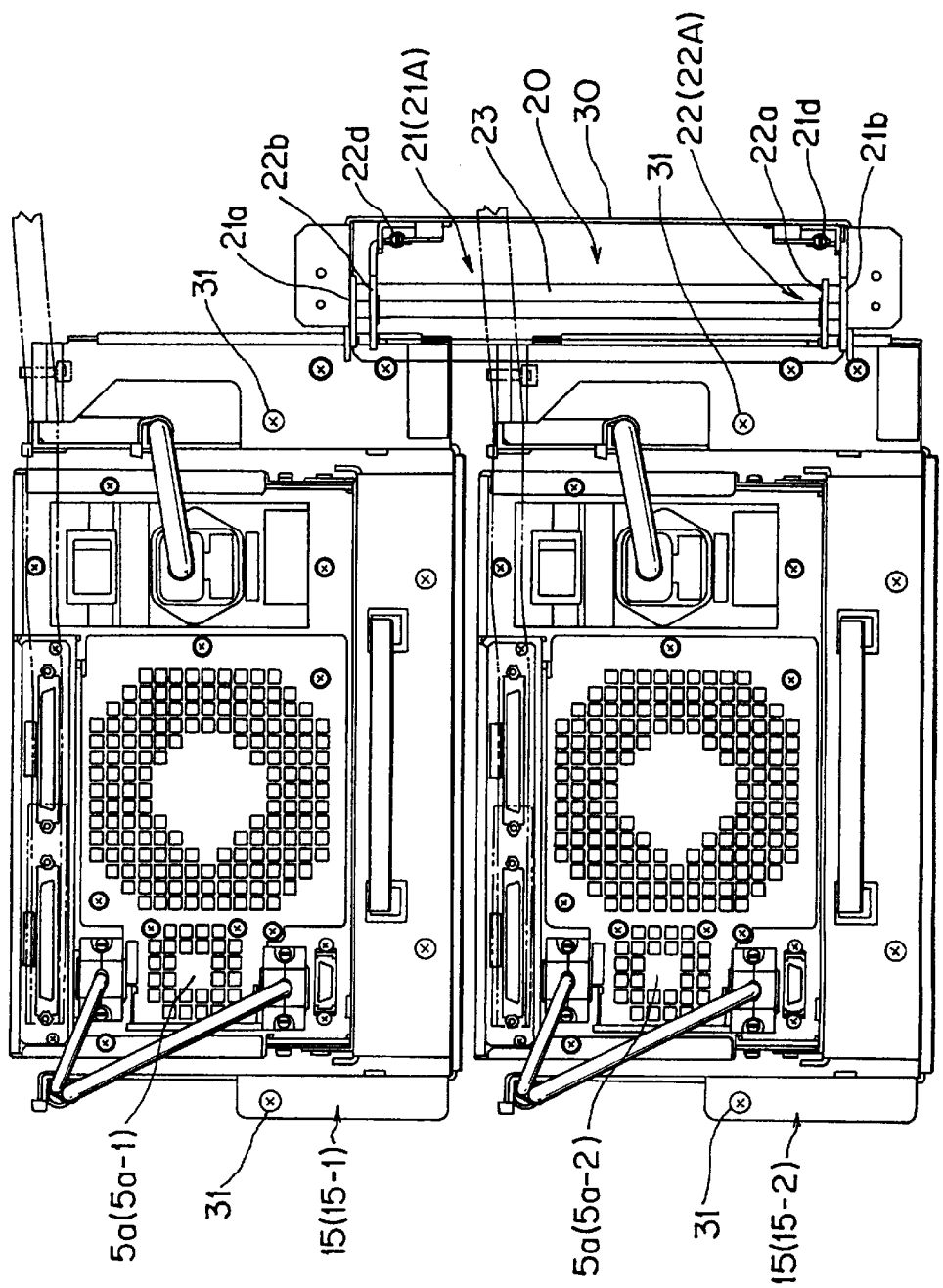
FIGS. 5, 6 and 7 are respectively a front elevational view, a plan view and a side elevational view each showing the deck lock mechanism according to this embodiment.
Figure 6:
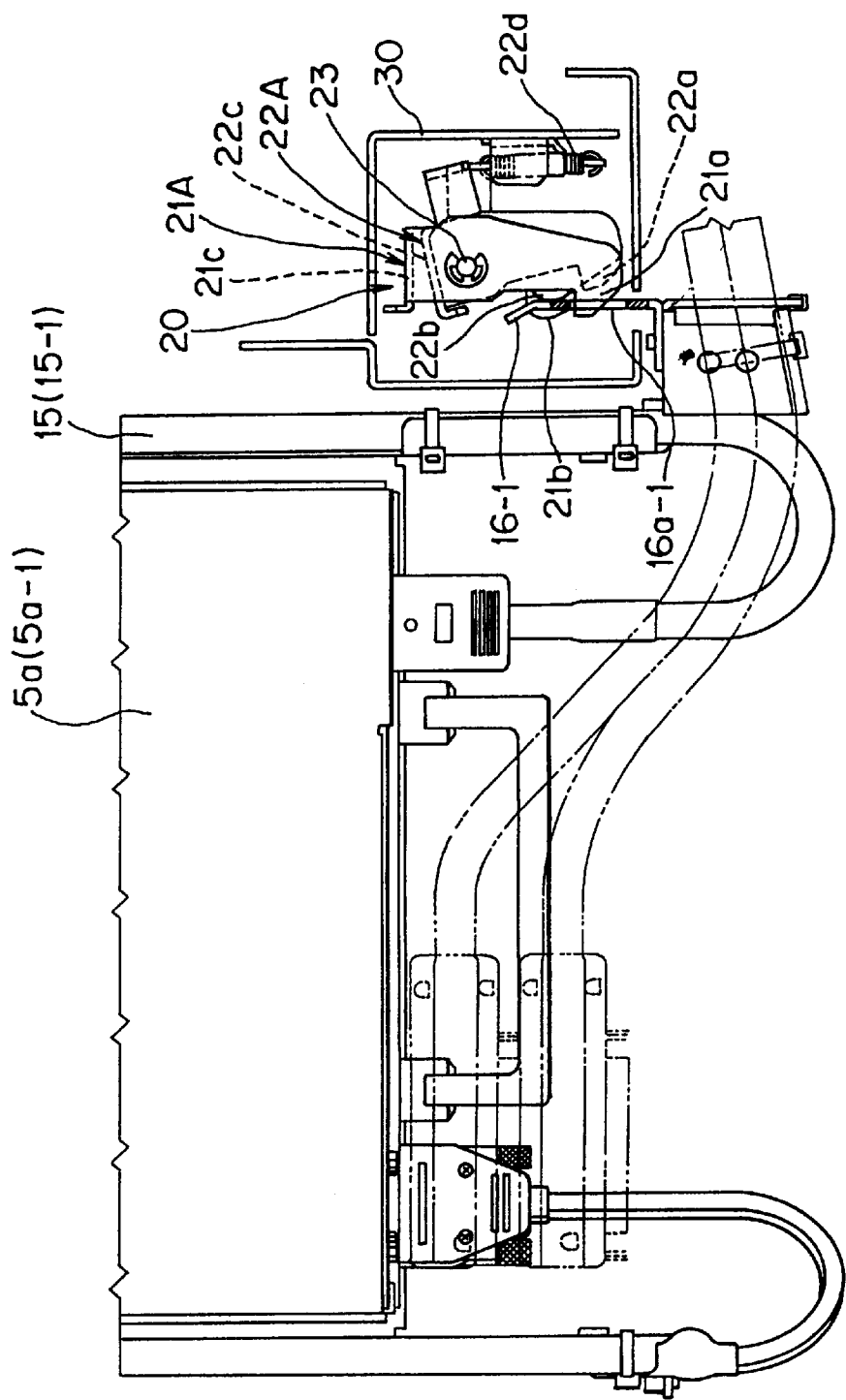
Figure 7:
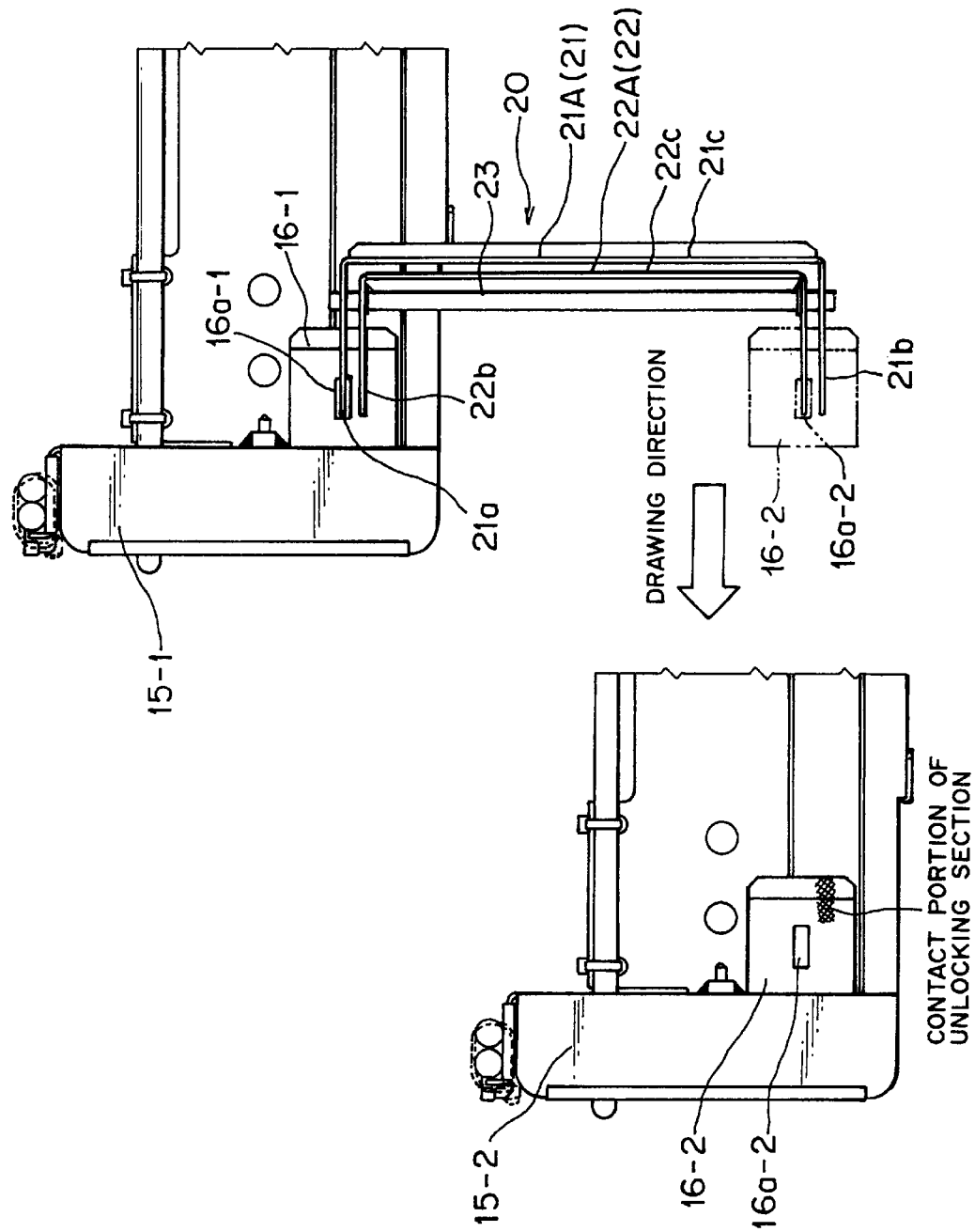

Referring now to FIGS. 1 and 5 to 7, a description will be made hereinbelow of a structure of the deck lock mechanism 20 according to this embodiment. FIG. 1 is a perspective view showing a principal portion of the deck lock mechanism 20, and FIGS. 5 to 7 are respectively a front elevational view, a plan view and a side elevational view each showing the deck lock mechanism 20.

In this embodiment, two decks 5a vertically adjacent to each other are related as one set to each other, and two deck trays 15, 15 are respectively assigned to the two decks 5a, 5a belonging to each of the sets to hold them, and one deck lock mechanism 20 is installed for these two deck trays 15, 15.

In the following description, the upper (other) one of the two decks 5a constituting the same one set is designated at numeral 5a-1, whereas the lower (one) deck thereof is denoted at numeral 5a-2, and further, the deck trays for holding these decks 5a-1, 5a-2 are depicted at 15-1, 15-2, respectively.

In addition, as shown in FIGS. 1, 6 and 7, locking metal members 16-1, 16-2 are fitted to the deck trays 15-1, 15-2, respectively. Further, these locking metal members 16-1, 16-2 have locking section insertion holes 16a-1, 16a-2 made into a rectangular configuration, and locking sections (claw sections) 21a, 22a of lock levers 21A, 22A, which will be described herein later, are fitted in the insertion holes 16a-1, 16a-2.

Furthermore, deck lock mechanism 20 is composed of a first locking mechanism 21 for inhibiting the lower deck 5a-2 (deck tray 15-2) from being drawn when the upper deck 5a-1 (deck tray 15-1) is in the drawn condition, and a second locking mechanism 22 for inhibiting the upper deck 5a-1 (deck tray 15-1) from being pulled out when the lower deck 5a-2 (deck tray 15-2) is in the drawn condition, which are housed within a casing 30.

The first locking mechanism 21 made up of a first lock lever 21A including a first locking section 21a, a first unlocking section 21b and a first connecting section 21c, and a first spring 21d. Likewise, the second locking mechanism 22 comprises a second lock lever 22A including a second locking section 22a, a second unlocking section 22b and a second connection section 22c, and a second spring 22d.

The first lock lever 21A and the second lock lever 22A are fitted to the casing 30 to be rotatable around the same rotary shaft 23.

The first lock lever 21A bears the first locking section 21a and the first unlocking section 21b at its upper and lower end portions, respectively, and the first locking section 21a and the first unlocking section 21b are connected to each other through the first connecting section 21c located in parallel to the rotary shaft 23. Further, the second lock lever 22A supports the second locking section 22a and the second unlocking section 22b at its lower and upper end portions, respectively, and the second locking section 22a and the second unlocking section 22b is coupled to each other through the second connecting section 22c disposed in parallel to the rotary shaft 23.

The first lock lever 21A is formed to surround the second lock lever 22A from the outside, and the first locking section 21a of the first lock lever 21A and the second unlocking section 21b of the second lock lever 22A are placed in the vicinity of the upper deck tray 15-1 (locking metal member 16-1), while the first unlocking section 21b of the first lock lever 21A and the second locking section 21a of the second lock lever 22A are situated near the lower deck tray 15-2 (locking metal member 16-2).

The first locking section 21a has a function to inhibit the pulling-out of the upper deck 5a-1 in a state of being fitted in the locking section insertion hole 16a-1 of the locking metal member 16-1 to lock the upper deck tray 15-1, and likewise, the second locking section 22a inhibits the upper deck 5a-2 from being pulled out by being engaged with the locking section insertion hole 16a-2 of the locking metal member 16-2.

The first unlocking section 21b, in a state where the lower deck tray 15-2 is in the accommodated condition, is put out of the way by a circumferential portion of the insertion hole 16a-2 of the locking metal member 16-2 attached to this deck tray 15-2, and similarly, the second unlocking section 22b, when the upper deck tray 15-1 is in the stored condition, is put out of the way by a circumferential portion of the insertion hole 16a-1 of the locking metal member 16-1 attached to this deck tray 15-1.

The first connecting section (first interlocking mechanism) 21c makes a connection between the first locking section 21a and the first unlocking section 21b as mentioned before, and further functions as an interlocking mechanism to interlock the first locking section 21a with the first unlocking section 21b as will be described herein later.

The first spring (first biasing member) 21d is designed to bias the first lock lever 21A in the direction of causing the first locking section 21a to come in the insertion hole 16a-1 of the locking metal member 16-1 (in the direction of locking on the upper deck tray 15-1 side; clockwise with respect to the rotary shaft 23 in FIG. 6).

Accordingly, in a state where the first unlocking section 21b is pressed by the locking metal member 16-2 to be put out of the way against the biasing force of the first spring 21d (in the lower deck 5a-2 stored state), in conjunction with this operation, the first locking section 21a, together with the first unlocking section 21b due to the connection therebetween through the first connection section 21c, rotates around the rotary shaft 23 (counterclockwise with respect to the rotary shaft 23 in FIG. 6), and is maintained in a state of being not fitted in the insertion hole 16a-1 of the locking metal member 16-1 (unlocked condition).

On the other hand, in a state where the first unlocking section 21b is not put out of the way (in the lower deck 5a-2 drawn condition), owing to the first spring 21d, the first locking section 21a, together with the first unlocking section 21b due to the connection therebetween through the first connecting section 21c, rotates around the rotary shaft 23 (clockwise with respect to the rotary shaft 23 in FIG. 6), so that it is kept in a state of being fitted in the insertion hole 16a-1 of the locking metal member 16-1 (locked condition).

In a similar way, the second connecting section (second interlocking mechanism) 22c establishes the connection between the second locking section 2a and the second unlocking section 22b as mentioned before, and further serves as an interlocking mechanism to interlock the second locking section 22a with the second unlocking section 22b as will be described herein later.

The second spring (second biasing member) 22d is designed to bias the second lock lever 22A in the direction of causing the second locking section 22a to get in the insertion hole 16a-2 of the locking metal member 16-2 (in the direction of locking on the lower deck tray 15-2 side; clockwise with respect to the rotary shaft 23 in FIG. 6).

Accordingly, in a state where the second unlocking section 22b is pressed by the locking metal member 16-1 to be put out of the way against the biasing force of the second spring 22d (in the upper deck 5a-1 stored state), in conjunction with this operation, the second locking section 22a, together with the second unlocking section 22b due to the connection therebetween through the second connection section 22c, rotates around the rotary shaft 23 (counterclockwise with respect to the rotary shaft 23 in FIG. 6), and is maintained in a state of being not fitted in the insertion hole 16a-2 of the locking metal member 16-2 (unlocked condition).

On the other hand, in a state where the second unlocking section 22b is not put out of the way (in the upper deck 5a-1 drawn condition), owing to the second spring 22d, the second locking section 22a, together with the second unlocking section 22b due to the connection therebetween through the second connecting section 22c, rotates around the rotary shaft 23 (clockwise with respect to the rotary shaft 23 in FIG. 6), so that it is kept in a state of being fitted in the insertion hole 16a-2 of the locking metal member 16-2 (locked condition).

FIGS. 6 and 7 show a state where the upper deck tray 15-1 is accommodated while the lower deck tray 15-2 is drawn.

Secondly, referring to 8A to 10B, a description will be taken hereinbelow of an operation of the deck lock mechanism 20 thus constructed according to this embodiment. FIGS. 8A and 8B are respectively an illustration of a portion indicated by an arrow A in FIG. 1 and an illustration of a portion pointed out with an arrow B in FIG. 1, each showing a state of storing the two decks 5a-1, 5a-2, FIGS. 9A and 9B are respectively an illustration of a portion indicated by the arrow A in FIG. 1 and an illustration of a portion pointed out with the arrow B in FIG. 1, each showing a state of pulling out the upper deck 5a-1, and FIGS. 10A and 10B are respectively an illustration of a portion indicated by the arrow A in FIG. 1 and an illustration of a portion pointed out with the arrow B in FIG. 1, each showing a state of pulling out the lower deck 5a-2.

In a state where the two decks 5a-1, 5a-2 (deck trays 15-1, 15-2) are both stored, as shown in FIGS. 8A and 8B, the first unlocking section 21b is pushed by the locking metal member 16-2 to be put out of the way against the biasing force of the first spring 21d, while the second unlocking section 22b is pressed by the locking metal member 16-1 to be put out of the way against the biasing force of the second spring 22d.

Accordingly, the first locking section 21a and the second locking section 22a are maintained in a state of being not fitted in the insertion holes 16a-1, 16a-2, respectively, (in the unlocked condition), and the upper and lower deck trays 15-1, 15-2 are both in the drawable conditions. Usually, the 8 decks 5a are stored within the TMU (locker) 5 in this state, and at this time, in order to prevent the deck trays 15-1, 15-2 from jumping out due to vibrations or the like, the respective deck trays 15 are fixed to the frame structure of the TMU 5 or the like by means of fixing screws 31 (see FIG. 5).

Figures 9A, 9B:
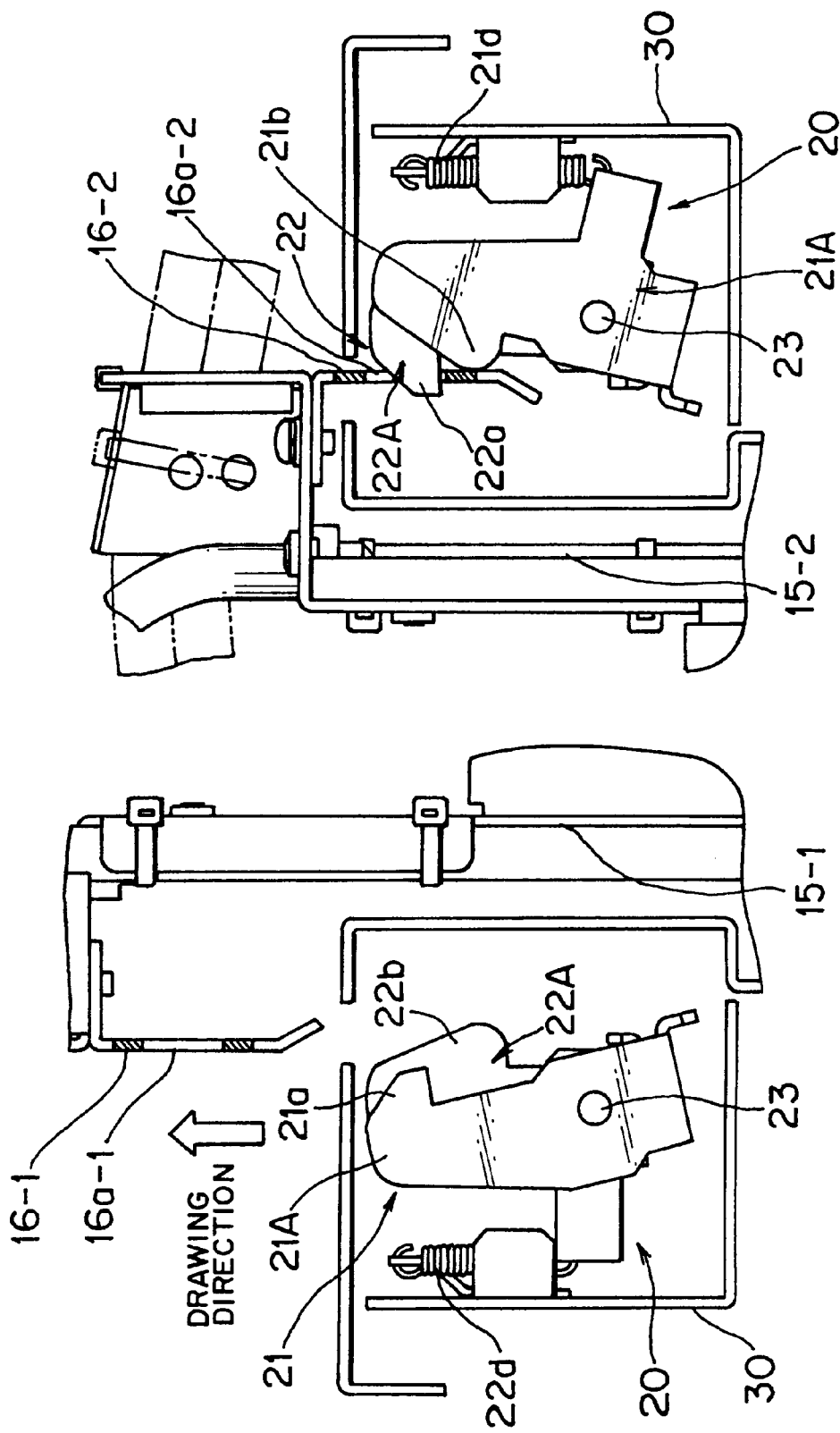
FIGS. 9A and 9B are an illustration of a portion indicated by an arrow A in FIG. 1 and an illustration of a portion pointed out with an arrow B in FIG. 1, respectively, showing a state in which the upper one of the two decks appertaining to the same set is in a drawn condition in this embodiment.

If in the state shown in FIGS. 8A and 8B the fixing screws 31 are loosened so that the upper deck tray 15-1 (deck 5a-1) is pulled out, as shown in FIG. 9A, the second unlocking section 22d returns to the non-retreated condition owing to the biasing force of the second spring 22d and the whole second lock lever 22A rotates around the rotary shaft 23, and as shown in FIG. 9B, the second locking section 22a comes in the insertion hole 16a-2 to automatically get into the locking condition of locking the lower deck tray 15-2, thus automatically inhibiting the lower deck tray 15-2 (deck 5a-2) being in the stored condition from being pulled out.

In the same manner, when in the state shown in FIGS. 8A and 8B the fixing screws 31 are loosened so that the lower deck tray 15-2 (deck 5a-2) is pulled out, as shown in FIG. 10B, owing to the biasing force of the first spring 21d, the first unlocking section 21d returns to the non-retreated condition and the entire first lock lever 21A rotates around the rotary shaft 23, and as shown in FIG. 10A, the first locking section 21a is fitted in the insertion 16a-1 of the locking metal member 16-1 to automatically come into the locking condition of locking the upper deck tray 15-1, thus automatically inhibiting the upper deck tray 15-1 (deck 5a-1) being in the stored condition from being drawn.

At this time, it is not until the deck tray 15-2 or 15-1 being presently in the drawn condition is accommodated that the locking state of the deck tray 15-1 or 15-2 being in the accommodated condition comes to an end. Thus, while the maintenance or inspection is made for the deck tray 15-2 or 15-1 pulled out, the deck tray 15-1 or 15-2 being in the stored condition is surely locked by the first locking mechanism 21 or the second locking mechanism 22, and even if the fixing screws 31 are loosened, it is impossible to pull out the deck tray 15-1 or 15-2 being in the stored condition.

With the above-described constitution, in the TMU 5 according to this embodiment accommodating the 8 decks 5a, one of the decks 5a appertaining to each set is drawable, that is, the total number of decks 5a drawable at once reaches 4.

In the deck lock mechanism 20 and the library apparatus 1 including this deck lock mechanism 20 according to the embodiment of this invention, when pulling out one of the two deck trays 15-1 and 15-2 belonging to the same set, the locking mechanism 21 or 22 automatically inhibits the other deck tray 15-1 or 15-2 from being drawn, so that the number of decks 5a drawable is automatically limited to half the total number of decks 5a or less without the manual operation by the operator, which sharply enhances the work efficiency at the maintenance and inspection of the decks 5a, and which certainly prevents the occurrence of the falling-down or deformation of the TMU 5 accommodating the decks 5a, thus ensuring the safety and the structural accuracy of the library apparatus 1. Consequently, one TMU 5 can accommodate a large number of (in this case, 8) decks 5a.

It was found from the weight balance and strength of the TMU 5 to which this invention is applicable that there was no possibility of the occurrence of falling-down or deformation of the TMU 5 until the number of the decks 5a pulled out reaches 4.

Furthermore, although a lock mechanism can also be taken which is effective to all of the 8 decks 5a and limits the number of drawable decks 5a to 4, such a lock mechanism is undesirably complicated and requires a large mounting space. In this embodiment, since one deck lock mechanism 20 is provided for two decks 5a, the deck lock mechanism 20 becomes simple in structure and does not require a large mounting space.

Still further, the work contents (maintenance, inspection and others) for the decks 5a mounted in the TMU 5 can not be done in a state where the two decks 5a adjacent vertically to each other are simultaneously pulled out, that is, the concurrent pulling-out of these two decks 5a are unnecessary. Accordingly, a structure like the deck lock mechanism 20 according to this embodiment which allow only one of the upper and lower (two) decks 5a to be drawn can consequently contribute to further improvement of the work efficiency.

Although in the above description of the embodiment 8 decks are arranged vertically within the TMU of the library apparatus, this invention is not limited to this.

Furthermore, although in the above-described embodiment two decks adjacent vertically are related as one set, in case where there are decks adjacent transversely to each other, the deck lock mechanism can also be made in a state where these two adjacent decks are grouped as one set.

Still further, although in the above description of the embodiment the deck trays are locked, a way to lock the deck bodies is also adoptable.

Moreover, although in the above description of the embodiment the deck lock mechanism according to this invention is applied to the TMU of the library apparatus, the deck lock mechanism according to this invention is applicable as long as it is a locker accommodating the decks.

In any case, needless to say, the same effects as mentioned above are obtainable.

It should be understood that the present invention is not limited to the above-described embodiment, and that it is intended to cover all changes and modifications of the embodiment of the invention herein used for the purpose of the disclosure, which do not constitute departures from the spirit and scope of the invention.

What is claimed is:

1. A deck lock mechanism, adapted to be installed in a locker accommodating a plurality of pairs of decks, each deck being designed to process a storage medium within a cartridge and being drawable from the locker, for preventing each pair of decks from being concurrently drawn from the locker when only one deck of each pair is intended to be drawn, said deck lock mechanism comprising:

for each said pair of decks, (a) a first locking mechanism, supported on an inside wall of a locker and responsive to the drawing and inserting of the first deck as an intended deck to selectively come into and out of a locking engagement with a second deck as an unintended deck, for inhibiting said unintended one deck in a mechanical manner from being drawn from the locker when said intended first deck is drawn from the locker, said first locking mechanism being responsive to the inserting of said first deck to release said second deck from the locking engagement; and (b) a second locking mechanism substantially identical in structure and operation with said first locking mechanism, said second locking mechanism being supported on the inside wall of the locker, and operatively connected with said first locking mechanism such that said second locking mechanism is responsive to the drawing and inserting of said second deck as the intended deck to selectively come into and out of a locking engagement with said the first deck as the unintended deck, for inhibiting said unintended other deck in a mechanical manner from being drawn from the locker when said intended second deck is drawn from the locker, said second locking mechanism being responsive to the inserting of said second deck to release said first deck from the locking engagement.

2. A deck lock mechanism as defined in claim 1, wherein said first locking mechanism includes:

(a) a first lock lever having
   (i) a first locking section for inhibiting the first deck from being drawn in a state of being engaged on a first deck side;
   (ii) a first unlocking section made to be put out of the way by the second deck when the second deck is stored in said locker; and
   (iii) a first interlocking mechanism for interlocking said first locking section with said first unlocking section so that said first locking section breaks off its locking condition when said first unlocking section is put out of the way, while establishing a locking condition with the first deck side when said first unlocking section is not put out of the way; and (b) a first biasing member for biasing said first locking section in a direction of establishing said locking condition with the first deck side.

3. A deck lock mechanism as defined in claim 1, wherein said second locking mechanism includes:

(a) a second lock lever having
   (i) a second locking section for inhibiting a second deck from being drawn in a state of being engaged on the second deck side;
   (ii) a second unlocking section made to be put out of the way by the first deck when the other deck is stored in said locker; and
   (iii) a second interlocking mechanism for interlocking said second locking section with said second unlocking section so that said second locking section breaks off its locking condition when said second unlocking section is put out of the way, while establishing a locking condition with the second deck side when said second unlocking section is not put out of the way; and (b) a second biasing member for biasing said second locking section in a direction of establishing said locking condition with the second deck side.

4. A deck lock mechanism as defined in claim 2, wherein said second locking mechanism includes:

(a) a second lock lever having
   (i) a second locking section for inhibiting the second deck from being drawn in a state of being engaged on a second deck side;
   (ii) a second unlocking section made to be put out of the way by the other deck when the first deck is stored in said locker; and
   (iii) a second interlocking mechanism for interlocking said second locking section with said second unlocking section so that said second locking section breaks off its locking condition when said second unlocking section is put out of the way, while establishing a locking condition with the second deck side when said second unlocking section is not put out of the way; and (b) a second biasing member for biasing said second locking section in a direction of establishing said locking condition with the second deck side.

5. A library apparatus comprising:

(a) a storage rack for storing cartridges each accommodating a storage medium;

(b) a plurality of pairs of decks, each deck being operable to have access to the storage medium within the cartridge when the cartridge is inserted in the deck;

(c) an accessor for transferring the cartridge between said storage rack and each said deck;

(d) a locker in which the individual decks are withdrawably inserted; and (e) a plurality of deck lock mechanisms installed one for each of said decks, for preventing the decks of each pair from being concurrently drawn from the locker when only one intended deck of each pair is drawn, each of said deck lock mechanisms including;

for each pair of the decks,
   (i) a first locking mechanism; supported on an inside wall of the locker and responsive to the drawing and inserting of a first deck as the intended deck to selectively come into and out of a locking engagement with a second deck as the unintended deck, for inhibiting said unintended one deck in a mechanical manner from being drawn from the locker when said intended first deck is drawn from the locker, said first locking mechanism being also responsive to the inserting of said first deck to release said second deck from the locking engagement; and
   (ii) a second locking mechanism substantially identical in structure and operation with said first locking mechanism, said second locking mechanism being supported on the inside wall of the locker, and operatively connected with said first locking mechanism such that said second locking mechanism is responsive to the drawing and inserting of the second deck as the intended deck to selectively come into and out of a locking engagement with the first deck as the unintended deck, for inhibiting said unintended other deck in a mechanical manner from being drawn from the locker when said intended one deck is drawn from the locker, said second locking mechanism being responsive to the inserting of said second deck to release said first deck from the locking engagement.

* * * * *

UNITED STATES PATENT AND TRADEMARK OFFICE
CERTIFICATE OF CORRECTION

PATENT NO. : 6,061,321
DATED : May 9, 2000
INVENTOR(S) : Kanetsuku, et. al.

It is certified that error appears in the above-indentified patent and that said Letters Patent is hereby corrected as shown below:

In claim 1, line 10, delete "a locker" and insert --the locker-- therefor

In claim 1, line 11, delete "the" and insert --a-- therefor

In claim 1, line 14, delete "one" and insert --second-- therefor

In claim 1, line 28, delete "the" (first occurrence)

UNITED STATES PATENT AND TRADEMARK OFFICE
CERTIFICATE OF CORRECTION

PATENT NO. : 6,061,321
DATED : May 9, 2000
INVENTOR(S) : Kanetsuku, et. al.

It is certified that error appears in the above-indentified patent and that said Letters Patent is hereby corrected as shown below:

In claim 3, line 4, delete "a" (second occurrence) and insert --the-- therefor

In claim 3, line 5, delete "the" and insert --a-- therefor

In claim 3, line 8, delete "other" and insert --first-- therefor

In claim 4, line 8, delete "other" and insert --first-- therefor

In claim 5, line 38 delete "other" and insert --first-- therefor

UNITED STATES PATENT AND TRADEMARK OFFICE
CERTIFICATE OF CORRECTION

PATENT NO. : 6,061,321
DATED : May 9, 2000
INVENTOR(S) : Kanetsuku, et. al.

It is certified that error appears in the above-indentified patent and that said Letters Patent is hereby corrected as shown below:

In claim 5, line 39, delete "one" and insert

--second-- therefor

Signed and Sealed this

Tenth Day of April, 2001

*Attest:*

NICHOLAS P. GODICI

*Attesting Officer*     *Acting Director of the United States Patent and Trademark Office*